United States Patent [19]
Bommart

[11] Patent Number: 5,151,202
[45] Date of Patent: Sep. 29, 1992

[54] ALUMINOTHERMIC WELDING DEVICE CRUCIBLE AND CRUCIBLE COVER FOR USE THEREWITH

[75] Inventor: Patrick Bommart, Rueil Malmaison, France

[73] Assignee: Delachaux S.A., France

[21] Appl. No.: 768,104

[22] Filed: Sep. 30, 1991

Related U.S. Application Data

[63] Continuation of Ser. No. 538,149, Jun. 13, 1990, abandoned.

[30] Foreign Application Priority Data

Jun. 14, 1989 [FR] France ............... 89 07872

[51] Int. Cl.⁵ ............................................. B23K 23/00
[52] U.S. Cl. ......................................... 249/86; 164/54
[58] Field of Search ............... 164/54; 249/86

[56] References Cited

U.S. PATENT DOCUMENTS

| | | |
|---|---|---|
| 3,091,825 | 6/1963 | Deppeler, Jr. |
| 3,189,959 | 6/1965 | Ahlert et al. ............ 164/54 |
| 3,242,538 | 3/1966 | Deppeler, Jr. |
| 4,205,721 | 6/1980 | Jorn et al. ............ 164/335 |
| 4,424,853 | 1/1984 | Khandros et al. ......... 164/57.1 |
| 4,881,677 | 11/1989 | Amos et al. ............ 164/54 |

FOREIGN PATENT DOCUMENTS

| | | |
|---|---|---|
| 495777 | 4/1930 | Fed. Rep. of Germany. |
| 548528 | 4/1932 | Fed. Rep. of Germany. |
| 2396620 | 2/1979 | France. |

Primary Examiner—Kuang Y. Lin
Attorney, Agent, or Firm—Blakely Sokoloff Taylor & Zafman

[57] ABSTRACT

An aluminothermic welding device. The device, which is for the butt welding of two metal members such as railroad rails, comprises a mould and a crucible the respective upper and lower faces of which are so formed with mutually complementary respective depressions and/or reliefs as to enable the crucible to be placed on the mould in a position in which the discharge aperture of the crucible and the pouring bush of the mould are coaxial and turned downwards and upwards respectively. This ensures the correct positioning of the crucible in relation to the mould. The crucible can also be constructed in a form enabling it to be used once and from a material selected for this purpose and advantageously differing from the material used for the mould.

38 Claims, 4 Drawing Sheets

ALUMINOTHERMIC WELDING DEVICE CRUCIBLE AND CRUCIBLE COVER FOR USE THEREWITH This is a continuation of application Ser. No. 538,149, filed Jun. 13, 1990, now abandoned.

The present invention relates to an aluminothermic welding device for butt welding two metal members such as railroad rails, and also to a crucible and a crucible cover for use therewith.

More particularly the invention relates to improvements to prior art aluminothermic welding devices comprising:

a crucible defining an aluminothermic reaction chamber and adapted to be used in a predetermined crucible orientation in which the crucible has in its lower portion a discharge aperture opening upwardly into said chamber and downwardly into a lower external face of the crucible along a predetermined vertical axis of the crucible, a mould adapted to be fitted locally onto the two metal members to define therearound a mould cavity in a predetermined mould orientation in which the mould has in its upper portion a pouring bush opening downwardly into said cavity and upwardly into an outer upper face of the mould along a predetermined vertical axis of the mould.

Devices of the kind specified are well known in various forms and used for the butt welding in situ of very diverse generally iron or steel metal members, usually oriented horizontally or substantially horizontally at least in a localized fashion on either side of the weld to be produced such as, for example, railroad rails, concrete reinforcing, cables, these examples being in no way limitative.

In their most widespread embodiment they comprise a durable crucible, i.e., one intended to be used a number of times and produced for that purpose in metal lined with refractory material, and a mould intended to be used only once, i.e., to be destroyed after a welding operation and made for this purpose from sand agglomerated with silicate and with carbon dioxide, a material having good resistance to heating which on the one hand enables it to undergo without damage the flow of metal resulting from the aluminothermic reaction and, on the other hand, to be subjected, before welding yet after having been put in place on the members to be welded, to a preheating which enables all traces of humidity to be driven out, which humidity might be harmful to the quality of the weld; this preheating also enables the members to be welded to be brought to a temperature favourable to welding, at least locally inside the mould cavity.

With a view to welding, after the mould has been preheated as stated, the crucible, supported by a bracket or a tripod and having a feeder bush continuing the reaction chamber upwards to contain the aluminothermic composition before the aluminothermic reaction and a metal cover adapted to prevent any splashing during the aluminothermic reaction, is placed above the mould in a position in which the discharge aperture discharges coaxially above the pouring bush, and the aluminothermic reaction is initiated in the reaction chamber; when a predetermined temperature is reached, the discharge aperture, at first closed, for example, by a thermally meltable closure member, is opened, for example, by the melting of such closure member, and the molten metal resulting from the aluminothermic reaction flows away towards the mould cavity between the members to be welded and locally around said members, crossing at the pouring bush a baffle formed by a fitted member preventing the metal from descending directly to the cavity.

This prior art technique enables welds of excellent quality to be produced, but it has the disadvantage of imposing on the user a certain number of constraints, some of which are moreover a necessary condition for obtaining such high quality welds.

Some of the constraints are due to the considerable weight of the crucible resulting directly from its construction, which is inconvenient to transport from one welding site to another, and also requires for support in relation to the members to be welded and in relation to the mould, a bracket or tripod which are themselves heavy and cumbersome, i.e., very difficult to transport from one welding site to another. The metal pouring bush and cover completing the crucible are themselves heavy and inconvenient to transport.

This prior art also has the disadvantage that the positioning of the crucible in relation to the mould with a view to welding leaves a lot to the initiative and assessment of the user; on the one hand excessive offsetting in the vertical direction between the discharge aperture and the pouring bush may harm the quality of the weld by causing both oxidation and too rapid a cooling of the metal flowing as the result of the aluminothermic reaction due to too much contact of the metal with the surrounding air, and by causing the metal to speed up enough to entrain moulding sand into the weld as a result of erosion and/or corundum, by a suction effect appearing at the end of metal pouring; moreover, a relative disalignment between the axes of the discharge aperture and the pouring bush may entrain corundum into the weld by the same suctional effect if it causes metal to flow directly to the mould cavity, i.e., a flow alongside the fitted member forming a baffle.

Lastly, since the refractory material entering into the composition of the crucible has a great affinity for water, before being put into operation the crucible must be subjected to a "lost" aluminothermic reaction, i.e., one which is not intended to perform a weld and is merely aimed at eliminating from the crucible all trace of humidity which, if it remained during an aluminothermic reaction intended for welding, would produce in the weld the appearance of bubbles considerably weakening its mechanical characteristics; for this reason also the crucible must first of all be dried by means of a torch at the start of each day of use.

In an attempt to obviate these disadvantages the prior art, for example, U.S. Pat. Nos. 3,091,825 and 3,242,538, have proposed a crucible unitary with the mould and, like the latter, intended to be destroyed after being used only once.

This solution may seem advantageous, since it eliminates the need to transport the crucible from one welding site to another and, since the positioning of the crucible in relation to the mould results solely from the correct positioning of the latter, by the closure and assembly together of two shells forming the mould as well as the crucible on the metal members to be welded, on the one hand enables any auxiliary support to be dispensed with, while on the other hand always ensuring the correct positioning of the crucible in relation to the mould, more particularly without any risk of prolonged contact between the molten metal and the surrounding air and without any risk of the molten metal speeding up excessively.

However, this solution has a serious disadvantage, since the mould cannot be preheated with the objects of eliminating therefrom all trace of humidity prior to welding and locally heating the members to be welded to a temperature favourable to welding. The fact is that as soon as the two shells are assembled around the members to be welded, the mould cavity and the corresponding zones of the members to be welded become difficult to access by the flame of a torch or any other preheating means; for this reason, to make the mould and crucible assembly it is necessary to use a material having a low affinity to water while being readily destructible after welding, i.e., in practice a sand agglomerated by means of a hydrophobic resin such as BAKELITE (a trademark for a synthetic resin), which has the disadvantage of not withstanding satisfactorily the temperatures used; this may be acceptable as regards the crucible, which can self-destruct quickly, but not for the mould, which must retain its cohesion for a comparatively longer time.

It is an object of the invention to obviate the majority of the disadvantages of these prior art techniques, and preferably all such disadvantages.

To this end the invention provides an aluminothermic welding device of the kind specified, characterized in that said respective lower face of the crucible and upper face of the mould are so formed with mutually complementary respective depressions and/or reliefs as to enable the crucible to be deposited on the mould with mutual fitting in an operative position in which the crucible and the mould occupy said crucible and mould orientations respectively and in which the discharge aperture and the pouring bush are coaxial.

In this way the crucible no longer requires its own support, since the crucible is borne by the mould, which can be of a known construction adapted to enable it to be rigidly connected to the metal members to be welded, which thus support the mould directly and the crucible indirectly; as a result there is no need to transport and position any crucible support; the feature also ensures that the crucible is always correctly positioned in relation to the mould, while their mutual fitting together means that the discharge aperture and the pouring bush are coaxial and the crucible is placed at a predetermined level in relation to the mould.

Moreover, since the crucible is dissociated from the mould, they can be made of different materials selected in dependence on criteria specific to the crucible and the mould respectively; for example, the conventional selection can be made for the mould of a sand agglomerated with silicate and hardened with carbon dioxide, having the disadvantage of a certain affinity for water but suitable for pre-welding torch preheating; the metal members to be assembled can also be preheated, at least in their zone localized inside the mould cavity, to the extent to which such members are directly accessible via the pouring bush; for the crucible a durable construction can be selected, for example, a metal lined in known manner with refractory material, or a construction for one-time-only use and made, for example, from a sand agglomerated by means of a resin such as BAKELITE, having a low affinity for water allows prolonged storage without the necessity of taking precautions to dry the crucible prior to use and short-term resistance to the temperatures reached during the aluminothermic reaction forms no handicap as regards the crucible; in the case of a crucible thus constructed with a view to single use, the reaction chamber is preferably given dimensions such that it can contain the full aluminothermic charge before the aluminothermic reaction, something which on the one hand enables the added bush to be dispensed with, i.e., limits to a minimum the durable equipment to be transported from one welding site to another while on the other hand it enables the aluminothermic charge to be conditioned directly in the crucible, in a particularly convenient and compact manner.

The mutual fitting together of the crucible and the mould in the operative position can be produced by constructionally very simple, i.e., easy and economic means. For example, said respectively lower face of the crucible and upper face of the mould have two respective flat zones which are oriented substantially perpendicular to the axis of the crucible and the axis of the mould respectively and converge together to form therebetween a dihedron of angle close to 180°, the dihedra formed by said flat zones of the lower face of the crucible and said flat zones of the upper face of the mould being mutually complementary so that each of said flat zones of the lower face of the crucible bears flat against a respectively corresponding flat zone of the upper face of the mould in said operative position.

Preferably said respectively lower face of the crucible and upper face of the mould have shapes such as to leave between the crucible and the mould at least one venting passage connecting the pouring bush to the outside of the crucible and the mould in said operative position; preferably said venting passage has a section which increases in a direction from the pouring bush towards the outside of the crucible and the mould; in a particularly simple embodiment, at least one of said flat zones of the lower face of the crucible is formed with a groove bounding said venting passage with the respectively corresponding flat zone of the upper face of the crucible in said operative position.

Similarly, preferably said respectively lower face of the crucible and upper face of the mould have shapes such that they leave between the crucible and the mould at least one corundum passage connecting the pouring bush to the outside of the crucible and the mould in said operative position; in a particularly simple embodiment, at least one of said flat zones of the upper face of the mould is formed with a notch bounding said corundum passage with the corresponding flat zone of the lower face of the crucible in said operative position.

Instead of, or preferably in addition to, the bearing of two mutually convergent planes of the lower face of the crucible against two mutually convergent planes of the upper face of the mould, the mutual fitting together in the operative position can result from the preferred embodiment of the invention wherein the lower face of the crucible has around the discharge aperture an annular rim projecting along said axis of the crucible and adapted to fit with clearance into the pouring bush in said operative position.

Also in a preferred embodiment of the crucible, the lower face of the crucible has respectively on either side of the discharge aperture projecting abutments so disposed as to extend along the mould respectively on either side of said upper face thereof in said operative position; preferably said abutments have respective free ends coplanar in a plane perpendicular to the axis of the crucible and, when the discharge aperture is enclosed by an annular rim, as indicated hereinbefore, said rim is retracted in relation to said plane, so that said abutments form feet enabling the crucible to be placed on the ground without the risk of damage to the rim.

Of course, the crucible can comprise in known manner inside the discharge aperture means for receiving a thermally meltable closure member; if the crucible is to be used only once, the thermally meltable closure member is positioned during manufacture inside the discharge aperture in a particularly simple and economic manner.

When, with a view to single use, the crucible is made from sand agglomerated by means of a hydrophobic resin, i.e., capable of self-destruction if it is exposed for too long to the temperature of the aluminothermic reaction, preferably the crucible has a localized portion of reduced thickness straight above the pouring bush in said operative position; to this end preferably the crucible has adjacent the discharge aperture a blind bore extending along an axis parallel with the axis of the crucible and entering the inside of the pouring bush in said operative position. The localized portion of reduced thickness creates in the crucible a weakened zone capable of self-destruction more quickly than the rest of the crucible in case of prolonged exposure to the temperature of the aluminothermic reaction, to allow a guided escape of the metal and molten corundum to the inside of the mould if the closure member of the discharge aperture should not have opened the aperture at the right time; if the closure member malfunctions, therefore, this prevents the crucible from yielding in an uncontrolled zone with the risk of letting the molten metal and corundum spread on the ground. Of course, when the crucible has a thermally meltable closure member, the portion of reduced thickness is however so calibrated that the weakened zone thus created yields only at a temperature higher than the melting temperature of the closure member in its normal operating conditions.

In the same case of a crucible for single use made, for example, from agglomerated sand and bonded by means of a hydrophobic resin, while the crucible has in the upward direction in said crucible orientation an upper edge bounding an upper opening of said chamber, the crucible preferably comprises an annular hoop which extends along said upper edge to reinforce the edge and takes a form integral with the crucible, for example, the form of a more particularly metal ring sunk in the upper edge of the crucible during its manufacture, or it can be disposed externally around said upper edge, for example, in the form of a ribbon of a polymeric material which fits tightly around said edge and is rigidly connected thereto, for example, by a self-adhesive or thermal retraction means, or else take the form of a paper or metal ribbon, these examples being in no way limitative. Such hoops can also be provided at other judiciously selected levels to prevent any undesirable cracking.

Advantageously the ribbon can be turned down on to the upper edge of the crucible to protect the latter, more particularly in the aforementioned preferred embodiment in which the reaction chamber is so large that no added feeder bush is required, so that it is possible to place directly on the upper edge of the crucible an added cover having vents to close the upper aperture of the reaction chamber during the aluminothermic reaction; in such a case the added cover, advantageously made like the crucible from agglomerated sand and bonded by means of a hydrophobic resin, to have the same characteristics of low affinity for water and ready destructability, is conveyed inside the crucible resting on the upper edge thereof, as during use, but in the upturned state; the presence of the venting means in the cover can advantageously result from the feature that the cover has along the axis of the crucible a depressed zone bounding with adjacent zones of the cover at least one annular venting aperture opening towards the outside of the crucible in the direction of the axis of the crucible; this has the advantage of obviating any risk of splashing out of the crucible during the reaction, although the cover is none the less not too high; more particularly its height can be compatible with the aforementioned conditioning of the aluminothermic composition inside the reaction chamber, between the upturned cover and the discharge aperture.

It will be noted that as long as they are used only once, in correspondence with their purpose when they are made from agglomerated sand and bonded by means of a hydrophobic resin, the cover and the crucible have during said single use clearly defined shapes and dimensions, i.e., the shapes and dimensions which they were given during manufacture and which are preferably such that the cover is adjusted in the best possible manner on the crucible; it is then easy to seal the members against one another, for example, by luting, so that the smoke and splashes of particles resulting from the aluminothermic reaction can escape only via the venting means of the cover, i.e., the annular venting aperture in the aforementioned embodiment of the cover, something which on the one hand contributes towards the safe use of the crucible and on the other hand means that the efficient filtration of the smoke and splashed particles can be envisaged when the conditions of use of the device according to the invention makes such filtration desirable and, for example, when rails are being welded in a tunnel, because of the localization of the escape of the smoke and splashed particles at the level of the venting means.

Said filtration can use very simple compact means which require no further contribution of energy, so long as the venting means can be dimensioned so as to oppose to the escape of the smoke a constriction which is adequate to confer thereon an energy which can be directly used for filtration.

Thus, in a preferred embodiment of the invention, it comprises a filter cap enclosing at least the venting means of the cover, and the cover and the filter cap have respective conforming surfaces enabling them to bear substantially continuously against one another and seal one another; in that case a filter head can be provided which encloses at least the venting means of the cover, the latter and the filter cap also having respective conforming surfaces enabling them to bear substantially continuously against one another and to seal one another.

The use of such a filter cap enables only purged smoke which can be tolerated even in confined surroundings to be thrown out of the device according to the invention, without impeding its convenience of transportation and use.

Of course, to the extent to which the mould, the crucible and the crucible cover of a device according to the invention themselves have original features, the invention relates not only to the welding device formed by the association of the crucible, its cover and the mould, but also to the crucible, the crucible cover and the mould considered separately from one another.

Other features and advantages of the invention will be gathered from the following description of a non-limiting embodiment thereof made with reference to the accompanying drawings which form an integral part of the description.

FIG. 3 is a section of the device taken through the horizontal plane III—III in FIG. 2; and FIG. 4 is a view similar to FIG. 1 showing an enlarged detail thereof, having the reference IV in FIG. 1.

Although the device according to the invention is described more particularly with reference to the welding of horizontally disposed railroad rails, its application is naturally not limited to the welding of such members and a man skilled in the art can make to the arrangements to be described any modification suitable for adapting the device to the welding of members of other kinds and possibly different orientation, without exceeding the scope of the present invention.

Figure 2:
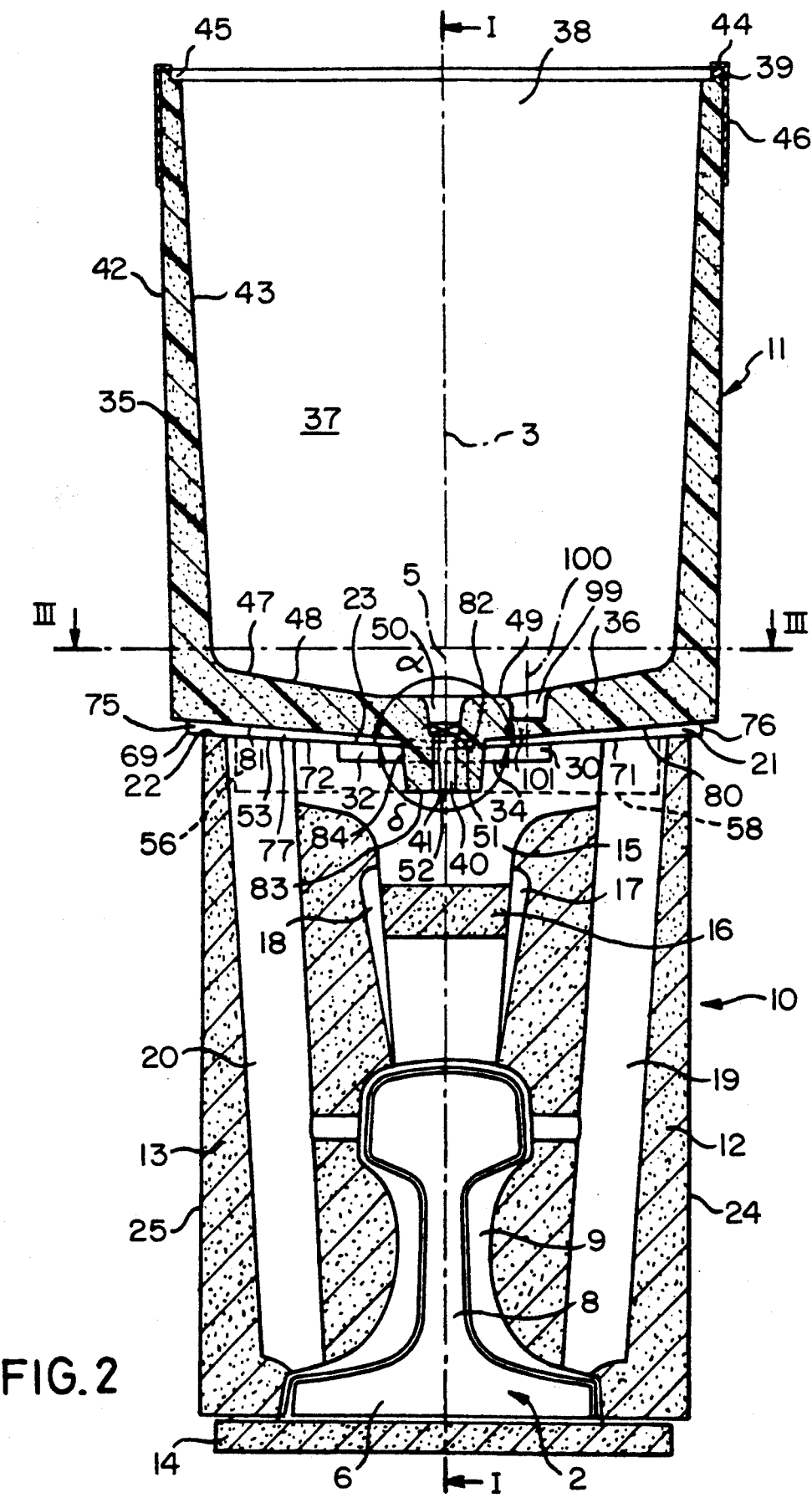
FIG. 2 is a view of the same device, except for the cover, also in the operative position, sectioned through a vertical plane II—II in FIG. 1, forming a plane of symmetry for the device and forming a plane of symmetry of one of the rails in relation to the other.
Figure 5:
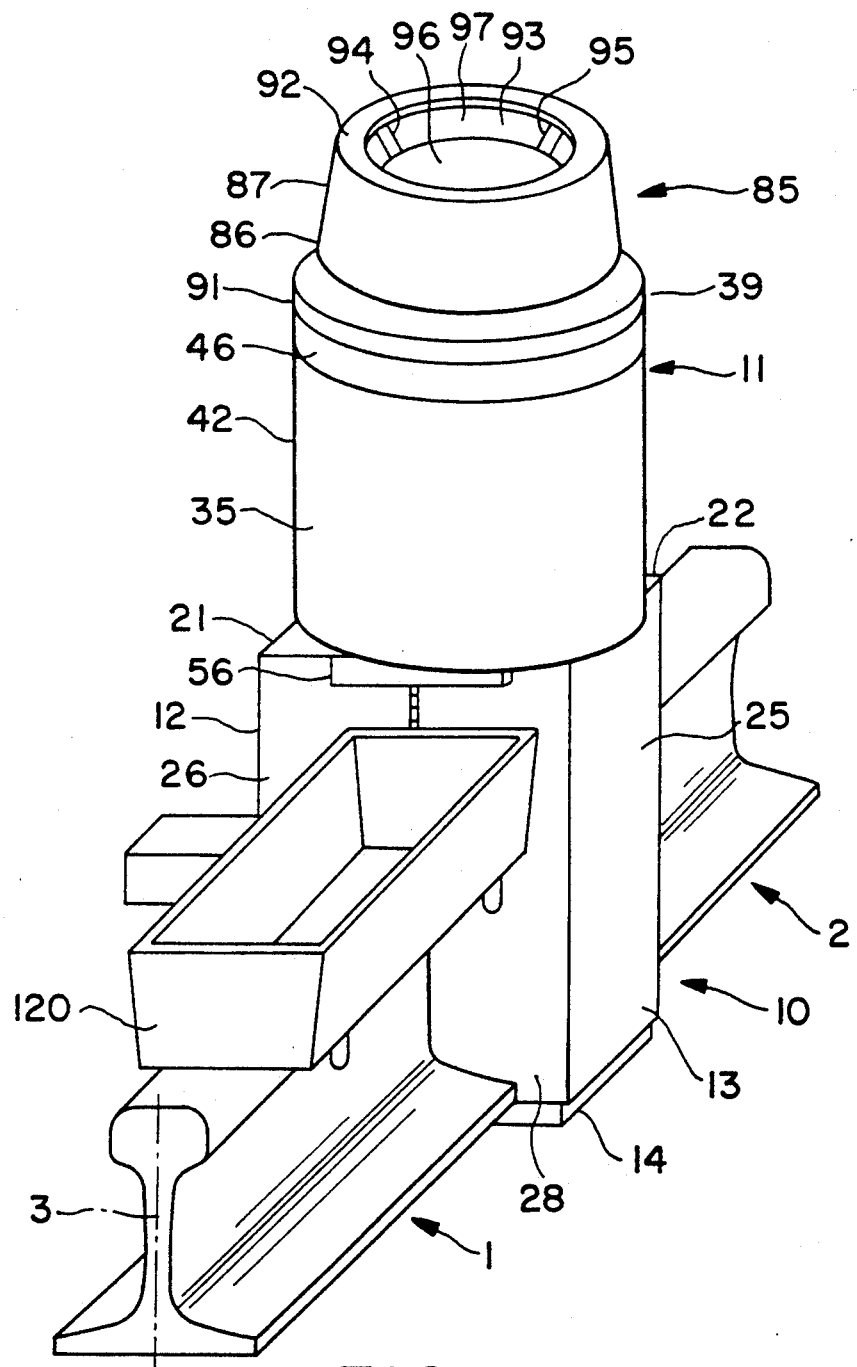
FIG. 5 is a perspective view of a welding mold and crucible attached to a railroad rail, showing the incorporation of an excess tank.
Figure 6:
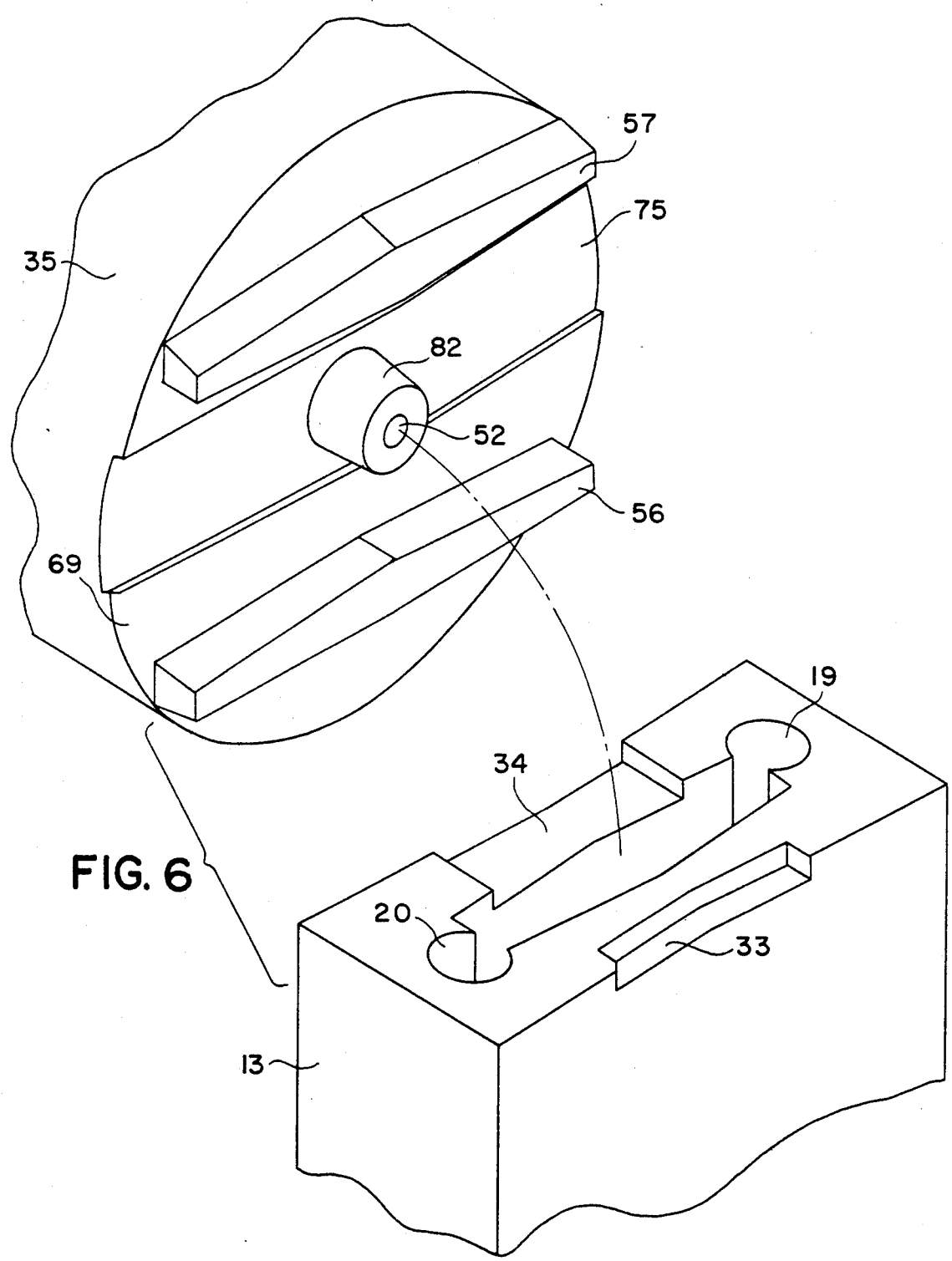
FIG. 6 is a perspective view of the bottom of the crucible and the top of the mold which shows features of each member that allow the two parts to fit together such that the discharge aperture of the crucible is coaxial with the pouring bush of the mold.

Two rectilinear, at least substantially horizontal, railroad rails 1 and 2 are so placed in alignment with one another as to have an at least substantially vertical common longitudinal plane of symmetry 3 coinciding with the sectional plane referenced I—I in FIG. 2 and are located symmetrically with one another in relation to another at least substantially vertical plane 4 which intersects the plane 3 along a substantially vertical axis 5; the two rails 1 and 2 thus have respective end faces 6, 7 parallel with the plane 4 and disposed facing one another so as to leave therebetween a space 8 adapted to be filled with a make-up metal obtained by aluminothermal reaction to butt-weld the two rails 1 and 2 to one another.

To this effect, in known manner, space 8 and the respective zones of the rails 1 and 2 immediately adjacent the end faces 6 and 7 thereof are received inside a cavity 9 of a mould 10 which, in the embodiment illustrated, is of the kind marketed by the Applicants under the name "dry joint prefabricated mould", which has been widely distributed and is described, for example, in French Patent No. 2,396,620; the mould is directly supported by the rails 1 and 2 and itself acts as a support according to the invention for an aluminothermic welding crucible 11 which is itself a feature of the invention, as also is its method of cooperation with the mould 10 in its operative position which will serve as a reference for the remainder of the description; of course, the scope of the invention would not be exceeded by using a mould which was in itself original and associating therewith a crucible suitably adapted more particularly to enable the crucible to be supported by the mould with mutual interfitting according to the invention.

The mould 10 illustrated being well known, it will simply be recalled that it is formed by three main members, namely two lateral shells 12 and 13 which are symmetrical with one another in relation to the plane 3 along which they abut one another with mutual interfitting (in a manner not shown) so as to bound the cavity 9 on either side of the plane 3 and in the upward direction, and a base or sole plate 14 bounding the cavity 9 in the downward direction, the three members 12, 13, 14 being assembled with one another and also with the two rails 1 and 2 by mutual clamping means (not shown) and being sealed to one another, and also from the rails 1 and 2, via felt joints (not shown) and also luting.

Apart from the respective halves of the cavity 9, disposed symmetrically with one another in relation to the plane 3 and following a respective symmetry in relation to the plane 4, the shells 12 and 13 bound in the direction of the plane 3, above the mould 9, respective halves of a pouring bush 15 widening in the upward direction, the halves of the pouring bush 15 being symmetrical with one another in relation to the plane 3 and respectively symmetrical in relation to the plane 4; prior to the weld being performed, before the crucible 11 is put in place but after the mould 10 has been put in place on the rails 1 and 2, the pouring bush 15 receives a torch for preheating the cavity 9 and the zones of the rails 1 and 2 adjacent their respective end faces 6 and 7, whereafter the bush 15 receives internally a fitted member 16 symmetrical in relation to the two plane 3 and 4 and forming a baffle subsequently forcing the molten metal resulting from the aluminothermic reaction to flow not directly along the axis 5 towards the cavity 9, into which the pouring bush 15 discharges downwardly, but via lateral zones of the pouring bush 15, i.e., in practice via the zones of the pouring bush 15 which are furthest away from the plane 3 and preferably are formed to this end with respective grooves 17, 18 provided symmetrically with one another in relation to the plane 3, in the shell 12 and the shell 13 respectively, and respectively symmetrical in relation to the plane 4. Moreover, each shell 12 and 13 bounds internally, in zones further away from the plane 3 than the respective corresponding half of the cavity 9 and the pouring bush 15, a respective pipe 19, 20 through which air and then metal rises as the cavity 9 is filled during aluminothermic welding, said pipes 19 and 20 respectively discharging downwards into a lower zone of the respective half of the cavity 9, on the other hand, i.e., adjacent the base or sole plate 14, while on the other hand they discharge towards the plane 3 in an upper zone of the respective half of the cavity 9.

As is also well known, the lateral shells 12 and 13, the base or sole plate 14 and the member forming a baffle 16 are made of a material which has adequate resistance to the welding heat and is easily destroyed after welding, such as, for example, a sand agglomerated with silicate and hardened with carbon dioxide.

In the upward direction the pipes 19 and 20, as well as the halves of the pouring bush 15 defined respectively by the lateral shell 12 and the lateral shell 13 discharge in respective flat upper surfaces 21, 22 thereof; the faces 21 and 22 are symmetrical with one another in relation to the plane 3 and both perpendicular to the plane 4, while they form in relation to the plane 3 a dihedron of angle close to 180° but different from 180°, so that they converge mutually along a rectilinear ridge (no reference) situated in the plane 3 and perpendicular to the plane 4, i.e., also to the axis 5; in the example illustrated, the faces 21 and 22 thus converge mutually downwards, forming between themselves a dihedron of angle α close to 180° but less than 90°, to form together an upper concave face 23 of the mould 10, but different shapes of the upper face 23 of the mould 10 might also be suitable for putting the invention into effect, so long as they enabled the crucible 11 to be fitted on to the mould 10, the modification for this purpose of the arrangements disclosed in the present application being derived from the normal approaches of a man skilled in the art and not exceeding the scope of the present invention; more particularly, instead of converging mutually downwards, the upper faces 21 and 22 of the shells 12 and 13 of the mould 10 might converge mutually upwards while maintaining their surface evenness, their perpendicularity in relation to the plane 4 and their mutual symmetry in relation to the plane 3, to give to the upper face 23 of the mould 10 a convex shape, the angle α being in that case greater than 180°, while remaining close to 180°.

It will be noted that in the known mould marketed by the Applicants the inclination of the upper faces 21 and 22 of the shells 12 and 13 of the mould 10 is already present, but as a mere consequence of the technological choices made with a view to producing the shells 12 and 13 by moulding; it also results from these choices that if the two shells 12 and 13 are bounded in the direction away from the plane 3 by respective flat surfaces 24, 25 symmetrical with one another in relation to the plane 3 and parallel therewith, the two shells 12 and 13 are in contrast bounded in the direction away from the plane 4 by respective flat faces which are not parallel with one another and, although mutually symmetrical in relation to the plane 4, form in relation the plane 3 an angle β smaller than 90° although close to 90°, as shown in FIG. 3, in which the references 26 and 27 respectively denote the faces thus bounding the shell 12 in the direction away from the plane 4, the references 28 and 29 denoting the faces thus bounding the shell 13 in the direction away from the plane 4; the faces 26 and 28 converge mutually on the plane 3 to connect the faces 24 and 25 to one another on one side of the plane 4, while the faces 27 and 29 converge mutually on the plane 3 to connect the faces 24 and 25 on the other side of the plane 4 to one another.

It will be noted that the faces 26 and 27 of the shell 12 and the faces 28 and 29 of the shell 13 have at their intersections with the face 21 and the face 22 respectively, in respective zones adjacent the plane 3, respective notches 30, 31, 32, 33 formed by localized thinning of the material forming the shell 12, 13, so that they can readily be enlarged as far as the pouring bush 15 during the installation of the mould 10 on the rails 1, 2, in order to form a corundum passage; for example, the notches 30, 32 corresponding to the face 26 of the shell 12 and the face 28 of the shell 13, situated on the same side of the plane 4, have been enlarged by reducing the material of which the shells 12 and 13 are made as far as the pouring bush 15, to form together a corundum passage 34 extending from the pouring bush 15, at a level lower than that of the upper face 23 of the mould 10, to the outside of the mould in a manner equally shared out on either side of the plane 3, so that, on completion of the filling of the cavity 9 and of the pouring bush 15 with the metal resulting from the aluminothermic reaction, the corundum can flow away to a corundum recovery tray 120 placed on the rail 1 (situated on the same side of the plane 4 as the faces 26 and 28 of the shells 12 and 13); of course, in addition to or in substitution for the notches 30 and 32, the notches 31 and 33 might be thus enlarged as far as the pouring bush 15 to ensure that the corundum flows away to a tray similar to tray 120, but placed on the rail 2.

All the arrangements just described with respect to the mould 10 are known.

The crucible 11 is a feature of the present invention.

In known manner the crucible 11 has a peripheral wall 35 having a general annular shape of revolution around axis 5, and a bottom wall 36 the general shape of which is also of revolution around axis 5, but which is flat and generally oriented transversely in relation to the axis 5; together the walls 35 and 36 bound inside the crucible 11 an aluminothermic reaction chamber 37 discharging on the one hand upwards via an upper opening 38, bounded by an upper edge 39 of the peripheral wall 35, and on the other hand downwards via a discharge aperture 40 with which the bottom wall 36 is formed and which has a shape of revolution around the axis 5, which it will be noted is common to the pouring bush 15 in the illustrated position of use of the crucible 11 and mould 10.

In the non-limiting but preferred embodiment of the crucible 11 which has been illustrated, the two walls 35 and 36 of the crucible 11 are made from a single piece of a material which has both a low affinity for humidity and can readily be destroyed after use such as, for example, an agglomerated sand bonded by means of a hydrophobic resin such as BAKELITE; it is produced by moulding during which there is incorporated in the crucible 11, inside the discharge aperture 40, a thermally meltable closure member 41 taking the form of a washer oriented perpendicular to the axis 3 and adapted to melt to open the discharge aperture 40 when a predetermined temperature is reached in the aluminothermic reaction chamber 37 in known manner.

By way of non-limiting example, the peripheral wall 35 is bounded, in the directions away from and toward the axis 5 respectively, by a cylindrical outer peripheral face 42 of revolution around the axis 5 and by a downwardly convergent truncated inner peripheral face 43 of revolution around the axis 5, forming in relation to the axis 5 an angle (no reference) on the order of only a few degrees, so that the shape of the inner peripheral face 43 is substantially cylindrical; in the upper direction, at the level of the upper edge 39 of the crucible 11, the face 42 is connected to a flat annular face 44 of revolution around the axis 5, the face 44 being connected to the face 43 via an annular recess 45 also of revolution around the axis 5; at the level of the upper edge 39 of the crucible 11 the peripheral face 42 thereof has an annular hoop 46 reinforcing the wall 35 at this level; in a particularly simple and economic manner, the hoop 46 can be formed from a ribbon of a polymeric material fitting tightly around the peripheral face 42 at the level of the upper edge 39 and rigidly connected to said peripheral face 42 at said level, for example, by gluing or thermal shrinking, or from a paper ribbon fitting tightly around the peripheral face 42 and glued thereto at the level of the upper edge 39, or else by a metal ribbon enveloping the peripheral face 42 at said level and rigidly connected thereto by clamped interfitting; preferably the ribbon forming the hoop 46 is bent down on the face 44, as shown, and also fits tightly round the face 44, to which it can be rigidly connected; of course, the hoop 46 might be replaced by other means for reinforcing the peripheral wall 35 at the level of its upper edge 39 and if necessary at other levels, for example, by an annular, more particularly metal, reinforcement sunk in the material from which the crucible is made adjacent its upper edge 39, around its upper opening 38 or at any other suitable level, such reinforcement being possibly omitted in the case of a crucible 11 which is strong enough to be used on several occasions, being made, for example, from a metal lined with refractory material.

The bottom wall 36 has an upper face 47 having a peripheral zone 48 connected via a fillet to the inner peripheral face 43 of the peripheral wall 35 in the direction away from the axis 5, and a central zone 49 to which the peripheral zone 48 thus connects the peripheral face 43 of the peripheral wall 35; the peripheral zone 48 has a downwardly convergent frustrated shape of revolution around the axis 5 and forms in relation thereto an angle (no reference) close to 90°; the central zone 49 is a flat annular zone of revolution around the axis 5 to which it is perpendicular, and the discharge aperture 40 emerges thereinto in the upper direction along the axis 5 by a face 50 in the form of a downwardly convergent funnel of revolution around the axis 5; the face 50 of the discharge aperture 40 is connected downwards, via an upwardly facing annular shoulder 51 receiving the closure member 41, to a face 52 of the discharge aperture 40 which is a cylindrical face of revolution around the axis 5.

In the downward direction the bottom wall 36 is bounded by a lower face 53 which is symmetrical in relation to the plane 3 and in relation to the plane 4 and which, if it converges downwards, has a shape which, in the embodiment illustrated, differs from a shape of revolution around the axis 5 and, according to the invention, is adapted more particularly to enable the crucible 11 to be fitted on to the mould 10.

In the embodiment illustrated the lower face 53 of the bottom wall 36 thus has, successively in the direction approaching the plane 3:

two mutually coplanar flat zones 54, 55 perpendicular to the axis 5 and symmetrical with one another in relation to the plane 4, the two zones 54 and 55 being bounded by joining with the outer peripheral face 42 of the peripheral wall 35 of the crucible 11 in the direction away from the axis 5;

two generally spindle-shaped ribs 56, 57 symmetrical with one another in relation to the plane 4 and extending along directions parallel with the plane 4 and perpendicular with the plane 3, when the ribs are viewed in a plane perpendicular to the axis 5; the ribs 56 and 57 are characterized in that they have in the downward direction respective coplanar flat faces 58, 59, more precisely of the same plane 60 offset downwards in relation to the zones 54, 55 to act as an abutment for the crucible 11 on the floor or any other support and, for example, in a conveying carton, before it is positioned above the mould 10; moreover, the ribs 56 and 57 have facing one another, i.e., towards the plane 3, respective faces 61, 62 each of which is itself formed by two flat facets 63, 64, 65 and 66 respectively which are parallel with the axis 5, each of the facets 63, 64, 65, 66 of one of the ribs 56, 57 being symmetrical with the other of the facets 63, 64, 65, 66 of the same rib 56 or 57 in relation to the plane 3 on which the two facets of each rib 56, 57 converge, forming in relation to the plane 3 a dihedron of angle γ close to 90° and greater than 90°, and in practice substantially complementary to the angle β; moreover, the facets 63, 64, 65, 66 being placed on the same side of the planes 3 and 4 as the faces 26, 28, 27, 29 of the shells 12 and 3 of the mould 10 respectively, in the position of use illustrated in the drawings, the facets 63 and 65 are mutually spaced apart perpendicular to the plane 4 by an average distance greater than the average distance separating, perpendicular to said plane, the faces 26 and 27 of the shell 12, and the facets 64 and 66 are mutually spaced apart, perpendicular to the plane 4, by an average distance greater than the average distance separating, perpendicular to said plane, the faces 28 and 29 of the shell 13, so that the facets 63, 64, 65, 66 are placed respectively opposite the faces 26, 28, 27, 29, while maintaining in respect thereto a clearance such that the ribs 56 and 57 cannot form an obstacle to the flow of corundum via those of the notches 30, 31, 32, 33 which have been freed as the passage 34 for corundum; this clearance is denoted by the reference 67 for the pair of facets 63, 64 and the pair of faces 26, 28, into which precisely the passage 34 discharges in the embodiment illustrated, and by the reference 68 for the pair of facets 65, 66 and the pair of faces 27, 29;

two bands 69, 70 mutually symmetrical in relation to the plane 3 and respectively symmetrical in relation to the plane 4; the bands 69 and 70 are moreover elongated perpendicular to the plane 3 and are adapted to fit around the upper face 23 of the mould 10 in zones thereof situated respectively between the pouring bush 15 and the pair of faces 26, 28 and between the pouring bush 15 and the pair of faces 27, 29; to this end the band 69 is formed by two downwardly turned flat facets 71, 72 which converge mutually along a ridge (no reference) situated in the plane 3 and perpendicular to the plane 4 and to the axis 5, forming between themselves a dihedron of angle δ complementary to the dihedron of angle α of the upper face 23 of the mould 10, so that in the position of use the facets 71 and 72 of the band 69 bear flat respectively against the upper face 21 of the shell 12 and the upper face 22 of the shell 13, thus assisting the user in disposing the crucible 11 symmetrically in relation to the supposed longitudinal plane 3 connected to the rails 1 and 2 and also to the mould 10 during the placing of the crucible 11 thereon; in a zone straddling the plane 3, the band 69 bounds the corundum passage 34 in the upward direction; of course, in the case of shapes of the upper face 23 of the mould 10 which differ from the concave shape described, the band 69 might have any complementary shape adapted to ensure the positioning of the crucible 11 in relation to the mould 10; more particularly in the case of a convex upper face 23 the band 69 would have a concave shape instead of the convex shape described and illustrated; similarly, to fit locally around the upper face 21 of the shell 12 and the upper face 22 of the shell 13 respectively, the band 70 has a flat facet 73 coplanar with the face 71 along the same plane perpendicular to the plane 4 and a facet 74 coplanar with the face 72 in the same plane perpendicular to the plane 4, so that the facets 73 and 74 occupy the same relative position as the facets 71 and 72 and more particularly converge on the prolongation of the ridge which is converged upon by the facets 71, 72, forming a dihedron of the same angle δ complementary to the angle α; it will be noted that the two bands 69 and 70 are disposed withdrawn upwardly in relation to the plane 60 shared by the ribs 56 and 57, to enable the latter to extend laterally along the mould 10 in the operative position illustrated and to facilitate access to said position when the user lowers the crucible 11 onto the mould 10 to place it onto the upper face 23 thereof by the two bands 69 and 70 of the lower face 53;

a groove 75 acting as a venting passage, straddling the planes 3 and 4 and disposed symmetrically in relation to both one and the other, the groove 75 being provided in a relative depression between the two bands 69 and 70 of the lower face 55 of the crucible 11; in the embodiment illustrated the groove 75 is bounded on the one hand by flat flank faces 76, 77, 78, 79 situated on the same side of the planes 3 and 4 as the facets 63, 64, 65, 66 respectively and parallel therewith respectively, and on the other hand by two flat end faces 80, 81 perpendicular to the plane 4 and disposed symmetrically with one another in relation to the plane 3 on one side and the other thereof respectively; each of the end faces 80, 81 therefore has a zone close to the plane 3, in which the face is situated opposite the pouring bush 15 more particularly, a zone relatively further away from the plane 3, in which the face is placed opposite the pipe 19 and the pipe 20 respectively, and lastly a zone even further away from the plane 3 and connecting with the outer peripheral face 42 of the peripheral wall 35, a zone in which it is placed opposite the zone of the face 21 disposed between the pipe 19 and the face 24 or the zone of the face 22 disposed between the pipe 20 and the face 25 respectively, to thus bound the venting passage and guide, via the pouring bush 15 and the pipes 19 and 20 to the outside of the mould 10 and the crucible 11, the air is driven out of the mould 10 when the molten metal is poured into the mould cavity 9; preferably, with a view to maximum efficiency, the groove 75 has a section which increases in the direction away from the plane 3, i.e., in relation to the pouring bush 15, towards the outside of the mould 10 and the crucible 11; for this purpose in the embodiment illustrated the faces 80 and 81 diverge, in the direction away from the plane 3, in relation to the coplanar facets 71 and 73 and in relation to the coplanar facets 72 and 74 respectively;

a rim 82 enclosing the discharge aperture 40 and more particularly the cylindrical face 52 thereof and forming a projection downwards along the axis 5 in relation to the faces 80 and 81 of the groove 75, and also in relation to the bands 69 and 70 of the lower face 55 of the crucible 11, to present a flat annular face 83 of revolution around the axis 5 to which it is perpendicular, in a position coplanar with the faces 58 and 59 of the ribs 56 and 57 or else withdrawn in relation to the plane 60 shared by said faces 58 and 59, so that the rim 82 is itself situated entirely withdrawn upwards in relation to said plane and the rim 82 is protected by the ribs when the crucible 11 is deposited on any support; in the direction away from the axis 5 the rim is bounded by a face 84 which has a truncated shape of revolution around the axis 5 and converges downwardly towards the face 83; in the operative position shown in the drawings, therefore, the rim 82 is fitted coaxially inside the pouring bush 15 and, when the crucible 11 is lowered on to the mould 10 to move it into the operative position, acts as a guide facilitating the coaxial alignment of the discharge aperture 40 and the pouring bush 15 in case of any slight initial relative misalignment; to this end, referring to the operative position, and at each level with reference to the axis 5, the face 84 has a diameter close to the smallest dimension which the pouring bush 15, itself converging downwards from the upper face 23 of the mould 10 at least in its upper zones, has at the same level, in practice perpendicular to the plane 4, but this diameter and these dimensions are nevertheless close to one another.

Not only therefore can the crucible 11 be very readily brought into its position of use in relation to the mould 10, but it is also retained by being reliably fitted onto the mould 10, to the point that it is no longer necessary to provide any special support other than the mould 10 itself.

Preferably, to prevent an abnormally lengthy exposure of the crucible to the temperature of the aluminothermic reaction, more particularly due to the malfunctioning of the thermally meltable closure member 41, resulting in an uncontrolled breakage of the crucible 11 by the destruction of the hydrophobic resin used as a bonding agent, with the risk of causing an accident by the molten metal and corundum flowing on to the ground in, the bottom wall 36 there is formed adjacent the discharge aperture 40, in a zone 101 which is straight above the pouring bush 15 in the operative position, with a portion of reduced thickness in the form of a blind bore 99 extending along a axis 100 orientated parallel with the axis 5 and situated in the plane 4 at a distance from the axis 5 such that flow through a preferential failure in this area enters the pouring bush 15 in the operative position. In the embodiment illustrated the blind bore 99 opens upwards into the peripheral zone 48 of the upper face 47 of the bottom wall 36 immediately adjacent the central zone 49, but it might also open downwards into the lower face 53 of the bottom wall 36, and more precisely into one of the faces 80, 81 naturally further away from the axis 5 than the rim 82. The blind bore 99 therefore leaves in the zone 101 a thickness of the bottom wall 36 which is smaller than the thickness which the bottom wall 36 has elsewhere and also smaller than the thickness of the peripheral wall 35 of the crucible 11, so that if the crucible 11 is exposed for an abnormally prolonged time to the temperature of the aluminothermic reaction, the zone 101 is destroyed with priority, to allow the metal and molten corundum to flow to the pouring bush 15 and the cavity 9 of the mould 11 without any risk to the user. Of course, the zone 101 must be destroyed only if it was impossible to perform pouring normally via the discharge aperture 40, and to this end the localized zone of reduced thickness resulting from the presence of the blind bore 99 is so calibrated that the zone 101 yields only when it reaches a temperature higher than the melting temperature of the thermally meltable closure member 41 in its normal operating conditions.

Figure 1:
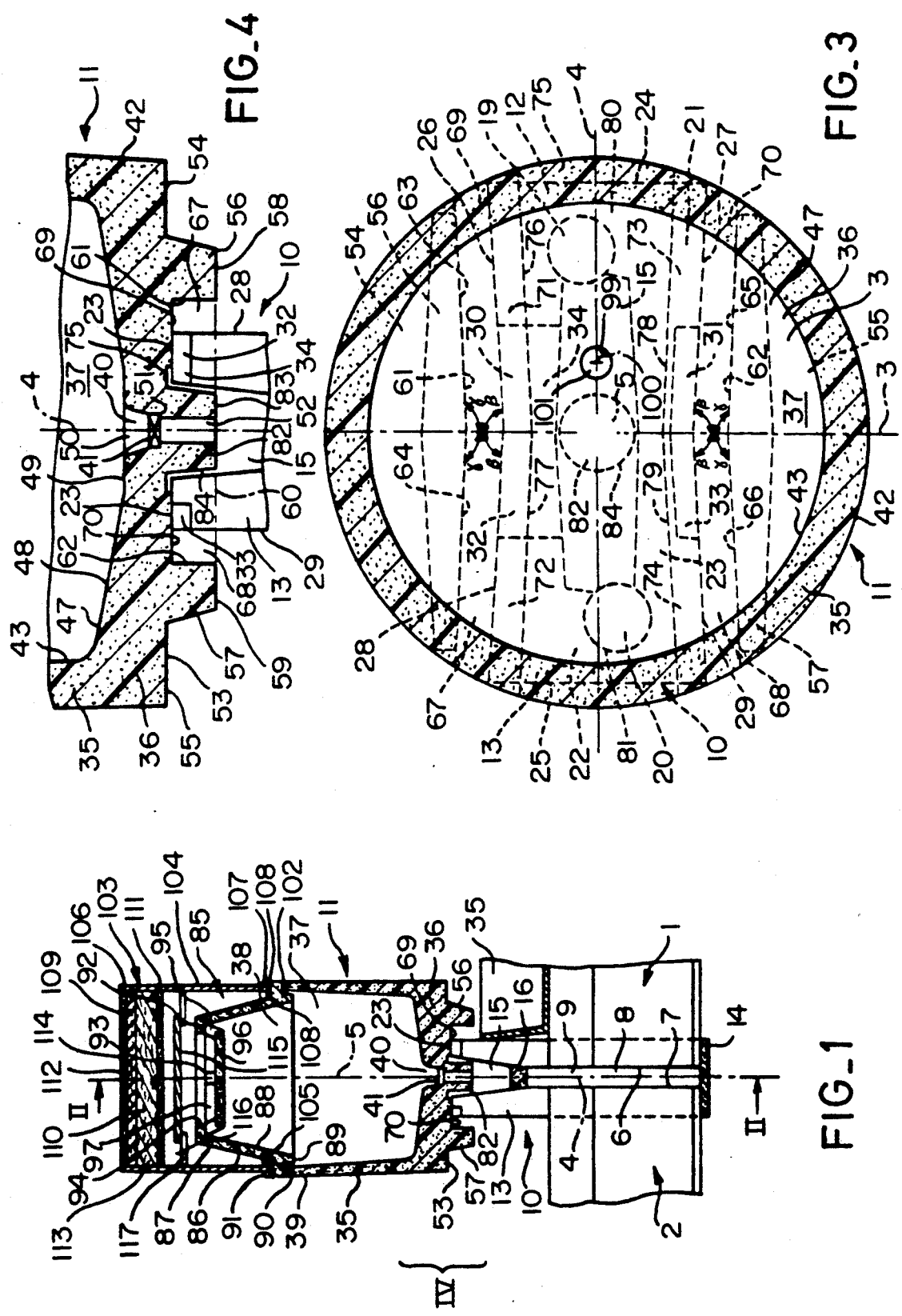
FIG. 1 is a view of a welding device according to the invention in its operative position pending the butt welding of two horizontally disposed railroad rails, sectioned through a vertical plane forming for both the device and for each of the two rails a longitudinal plane of symmetry referenced I—I in FIG. 2.

Advantageously, as illustrated in FIG. 1, associated with the crucible 11 is a cover 85 which is simply placed and fitted on to the upper edge 39 and is adapted to close the upper opening 38 of the chamber 37 to prevent splashing therefrom during the aluminothermic reaction, while allowing the hot gases resulting from said reaction to escape, since the chamber 37 has a volume such that any feeder can be dispensed with for containing the aluminothermic charge prior to the aluminothermic reaction, more particularly because of an adequate dimensioning for this purpose of the peripheral wall 35 parallel with the axis 5.

The cover 85 is shown in FIG. 1 in a position in which is closes the reaction chamber 37 in the upward direction, this being the position which it occupies during the aluminothermic reaction; it will be described with reference to said position.

The cover 85 has a general shape of revolution around the axis 5 and more particularly comprises a peripheral wall 86 bounded, in the directions away from the axis 5 and toward said axis respectively, by respective outer 87 and inner 88 truncated peripheral faces of revolution around the axis 5, said faces converging upwardly to form the same angle (no reference) with the axis 5; in the downward direction the inner peripheral face 88 is connected to a flat annular face 89 of revolution around the axis 5 to which it is perpendicular, said face 89 being connected via an annular groove 90 of revolution around the axis 5 to an annular edge 91 of revolution around the axis 5, bounding the outer peripheral face 87 downwardly and forming in relation thereto a projection in the direction away from the axis 5; the dimensions of the face 89, the annular groove 90 and the annular edge 91 are such that via the groove 90 the cover 85 is fitted inside the upper aperture 38 of the annular chamber 37 of the crucible 11 with minimum clearance and rests flat on the face 44 of said upper edge 30 via its edge 91.

The wall 86, just like the walls 35 and 36 of the crucible 11, is continuous so that, more particularly, the respective wall 35 of the crucible 11 and the wall 86 of the cover 85, being interconnected via the edge 91, prevent any splashing from the chamber 37 during the aluminothermic reaction.

However, in the upward direction at a distance from the edge 91, measured parallel with the axis 5, smaller than the depth of the chamber 37, measured parallel with the axis 5 from the face 44 of the wall 35 of the crucible 11, the wall 86 has an annular edge 92 with which the faces 87 and 88 are connected in the upward direction; this annular edge 92 of revolution around the axis 5 is turned towards the latter and bounds, via a cylindrical face 94 of revolution around the axis 5, an upper opening 93 of the cover 85.

Directly opposite the opening 93, depressed downwards in relation to the edge 92, the peripheral wall 86 bears, connected via strictly localised ribs 95, (for example four ribs 94 diametrically opposite in pairs with reference to the axis 5 and situated in the planes 3 and 4), a continuous flat end wall 96 in the form of a disc of revolution around the axis 5, the wall 96 cooperates with the edge 92 to bound an annular venting aperture 97 of revolution around the axis 5; there is little probability that outward splashing will take place via the aperture 97 thus disposed; moreover, if such splashing should take place, it would be produced in the direction of the axis 5, with little risk of it spreading outwards in the direction away from the axis 5, i.e., thus reaching the users of the device, according to the invention.

When the crucible 11 is made from a material suitable for single use, the cover 85 is also preferably made from such a material, for example an agglomerated sand bonded by means of an hydrophobic resin such as BAKELITE; its dimensions parallel with the axis 5, its shape and the turning-down of the hoop 46 on the face 44 of the peripheral wall 35 of the crucible 11 therefore allow storage and transportation without any risk that the cover 85 will be damaged in the upturned state, its peripheral wall 86 being received in the reaction chamber 37 of the crucible 11 and its edge 91 resting upside down on the upper face 44 of the peripheral wall 35 of the crucible 11.

It will be noted that in the position which it occupies during the aluminothermic reaction the cover 85 rests substantially continuously via its annular edge 91 on the face 44 of the upper edge 39 of the crucible 11, something which enables the elements t be sealed in relation to one another by means of a joint, such as a fillet 102 of luting paste interposed between the annular edge 91 and the face 44; it will be noted that the bending down of the hoop 46 onto the face 44, in the embodiment described and illustrated, enables the hoop 46 to contribute towards the sealing, since the hoop 46 is made from a material capable of withstanding the temperature of the aluminothermic reaction for an adequate time. The smoke and particles generated by the aluminothermic reaction can therefore leave the reaction chamber 37 of the crucible 11 only via the venting aperture 97, with practically no risk of reaching the users, because of the shape of said aperture; moreover, in that case, if necessary, the efficient filtration of the smoke and splashed particles can be ensured by covering the venting aperture 97 with a filter cap 103 sealed in relation to the cover 85.

A non-limiting embodiment of a filter cap 103 of the kind specified is shown in FIG. 1 in a form comprising a tubular tight-sealing peripheral wall 104 of revolution around the axis 5, referring to the position in which the filter cap 103 is shown in FIG. 1, and which forms its position of use during the aluminothermic reaction, said peripheral wall 104 having in the downward and upward directions respectively flat annular edges 105, 106 of revolution around the axis 5, to which they are perpendicular.

By its edge 105 the peripheral wall 104 bears an annular integral edge 107 of revolution around the axis 5 and turned in the direction away from said axis 5, the annular edge 107 being so shaped that it rests substantially continuously flat on the annular edge 91 of the cover 85 via a joint, such as a fillet 108 of luting paste, thus sealing the peripheral wall 104 in relation to the annular edge 91 of the cover 85; to this end a durable joint of refractory material might also be integrated with the annular edge 107 of the filter gap 103 in a manner which is not shown, but can be readily envisaged by an engineer in the art.

Via its edge 106 the peripheral wall 104 bounds an outlet orifice 109 for the filtered smoke above the edge 92 of the cover 85 and its venting aperture 97.

Inside the orifice 109, immediately adjacent the edge 105, i.e., also above the edge 92 of the cover 85 and its venting aperture 97, the peripheral wall 104 bears rigidly connected a filter washer 110 orientated perpendicular to the axis 5 and connected at all points to the peripheral wall 104 in the direction away from the axis 5.

In the embodiment illustrated the filter washer 110 is formed by two filter layers superimposed upon one another between two flat retaining grids 111, 112 orientated perpendicular to the axis 5 and peripherally connected rigidly to the peripheral wall 104, i.e, a lower layer 113 comparatively closer to the venting aperture 97 and adapted to retain the largest particles entrained by the smoke and to thermally protect the other or upper layer 114 which is adapted to retain the finest particles entrained by the smoke.

The lower layer 113 is also protected from splashes of particles by a deflector 115 of, for example sheet metal, which the peripheral wall 104 bears internally between the filter washer 110 and the edge of the cover 85 and at a distance from both. In the embodiment illustrated the deflector 115 takes the form of a flat disc of revolution around the axis 5, to which it is perpendicular, and has a diameter intermediate between the diameter of the face 94 of the edge 92 of the cover 85 and the inside diameter of the peripheral wall 104, so as to leave in the immediate vicinity thereof a rim 116 through which the smoke passes to the filter washer 110; the deflector 115 is rigidly connected to the peripheral wall 104 via brackets 117 extending across the rim 116 of passage radially with reference to the axis 5.

By way of non-limiting example, satisfactory results were obtained in tests by using a lower layer 113 of iron shavings of a thickness of about 40 mm, and an upper layer 114 of a refractory felt based on silica fibres (approximately 50.5%) and alumina fibres (about 44%) of a kind marketed by the Kerlane Company under the name PYRONAP 50, having an apparent bulk density of the order of 210 kg/m$^3$ and a thickness smaller than or equal to that of the iron shavings in dependence on the load losses imposed on the smoke between the reaction chamber 37 and said upper layer 114, it being understood that other materials can be chosen without exceeding the scope of the present invention; more particularly, it would be possible to use a filter washer 110 with a single filter layer or more than two layers.

It will be noted that by keeping the filter washer 110, in one or other of its variants, or by replacing it with an identically disposed sealing-tight wall, the deflector 115 being in that case eliminated, the peripheral wall 104 might also be designed so as to ensure the filtration of the smoke and splashed particles, for example, in a form comprising one or more tubular filter layers between two tubular grids.

Such embodiments of the filter cap 103 make it more particularly suitable to be used several times; it would not exceed the scope of the invention to design such a cap with a view to a single use, in which case it might, for example, be made integrally from a porous and refractory material, for example, a suitably shaped felt based on silica and alumina fibres, or the filter cap 103 might even be integrated directly with the cover.

Neither would the scope of the invention be exceeded by giving the filter cap 103 a shape different from the shape which has been described and making it bear against the cover 85, with mutual sealing, in a manner different from the manner described, whether the cover 85 retains the shape described or has a different shape; thus, for example, by keeping the shape described for the cover 85, the dimensions of the filter cap perpendicular to the axis 5 might be reduced, while otherwise retaining its shape as described, but giving its annular edge 107 a conicity complementary to that of the outer peripheral face 87 of the peripheral wall 86 of the cover 84, so that the filter cap can bear against said outer peripheral face 87 via said annular edge in a relationship of fitting conically together to encourage mutual sealing; such an embodiment has not been illustrated, but can readily be deduced from the embodiment described and illustrated.

Of course, the method of putting the invention into effect which has been described is only a non-limiting example; more particularly the Applicants have tried to give the lower face 53 of the crucible 11 a shape such that the crucible 11 fits onto the moulds which the Applicants at present manufacture and market, and which are usually associated with durable crucibles borne by a support independent of the mould 10; of course, the scope of the present invention would not be exceeded by so shaping the lower face 53 of the bottom wall 36 of the crucible 11 that the latter fits according to the invention on moulds of other makes, to be supported directly thereby, or else by making the moulds 10 shaped differently from the known moulds, the crucibles being so shaped as to enable them to be fitted onto these moulds in accordance with the present invention.

I claim:

1. An aluminothermic welding device for the butt welding of two metal members such as railroad rails comprising:
    a crucible defining an aluminothermic reaction chamber and adapted to be used in a predetermined crucible orientation in which the crucible has in its lower portion a discharge aperture opening upwardly into said chamber and downward into a lower external face of the crucible along a predetermined vertical axis of the crucible; and
    a mould adapted to be fitted locally onto the two metal members to define therearound a mould cavity in a predetermined mould orientation in which the mould has in its upper portion a pouring bush opening downwardly into said cavity and upwardly into an outer upper face of the mould along a predetermined vertical axis of the mould;
    wherein said respective lower face of the crucible and upper face of the mould are formed with mutually complementary respective depressions and reliefs as to enable the crucible to be deposited on the mould to mutually interfit in an operative position in which the crucible and the mould occupy said crucible and mould orientations respectively and in which the discharge aperture and the pouring bush are coaxial.

2. A device according to claim 1, wherein said lower face of the crucible and upper face of the mould have two respective flat zones which are oriented substantially perpendicular to the axis of the crucible and the axis of the mould respectively and converge together to form therebetween a dihedron of angle $(\alpha, \delta)$ approximately 180°, the dihedra formed by said flat zones of the lower face of the crucible and said flat zones of the upper face of the mould being mutually complementary so that each of said flat zones of the lower face of the crucible bears flat against a respectively corresponding flat zone of the upper face of the mould in said operative position.

3. A device according to claim 2, wherein said flat zones of the lower face of the crucible converge on the axis of the crucible, and said flat zones of the upper face of the mould converge on the axis of the mould.

4. A device according to claim 3, wherein said flat zones of the lower face of the crucible and the upper face of the mould respectively converge downwards in said operative position.

5. A device according to claim 1, wherein said respective lower face of the crucible and the upper face of the mould have shapes such as to leave between the crucible and the mould at least one venting passage connecting the pouring bush to the outside of the crucible and the mould in said operative position.

6. A device according to claim 5, wherein said venting passage has a section which increases in a direction from the pouring bush towards the outside of the crucible and the mould.

7. A device according to claim 5, wherein at least one of said flat zones of the lower face of the crucible comprises said venting passage with the respectively corresponding flat zone of the upper face of the mould in said operative position.

8. A device according to claim 1, wherein said respectively lower face of the crucible and upper face of the mould have shapes such that they leave between the crucible and the mould at least one corundum passage connecting the pouring bush to the outside of the crucible and the moulding said operative position.

9. A device according to claim 8, wherein at least one of said flat zones of the upper face of the mould is formed with a notch bounding said corundum passage with the respectively corresponding flat zone of the lower face of the crucible in said operative position.

10. A device according to claim 1, wherein the lower face of the crucible has around the discharge aperture an annular rim projecting along said axis of the crucible and adapted to fit with clearance into the pouring bush in said operative position.

11. A device according to claim 10, wherein the lower face of the crucible has respectively on either side of the discharge aperture projecting abutments so disposed as to extend along the mould respectively on either side of said upper face thereof in said operative position.

12. A device according to claim 11, wherein said abutments have respective free end coplanar in a plane perpendicular to the axis of the crucible.

13. A device according to claim 12, wherein said rim is in line with said plane.

14. A device according to claim 1, wherein the crucible comprises inside the discharge aperture means for accommodating a thermally meltable closure member.

15. A device according to claim 1, wherein the crucible comprises a thermally meltable closure member inside the discharge aperture.

16. A device according to claim 1, wherein the crucible is made of sand agglomerated by means of a hydrophobic resin.

17. A device according to claim 16, wherein the crucible has in the upward direction, in said crucible orientation, an upper edge bounding an upper opening of said chamber, and the crucible bears externally an annular hoop around said upper edge.

18. A device according to claim 17, wherein said annular hoop is a ribbon fitting tightly around said edge and rigidly connected thereto.

19. A device according to clam 16, wherein the crucible as a localized portion of reduced thickness straight above the pouring bush in said operative position.

20. A device according to claim 19, wherein the crucible has adjacent the discharge aperture a blind bore in said operative position.

21. A device according to claim 1, wherein the mould is of sand agglomerated with silicate.

22. An aluminothermic welding device for the butt welding of two metal members such as railroad rails, that has a mould adapted to be fitted locally onto the two metal members to define thereon a mould cavity in a predetermined mould orientation in which the mould has in its upper portion a pouring bush, opening downwardly into the cavity and upwardly into an outer upper face of the mould along a predetermined vertical axis of the mould, wherein the upper face of the mould has a predetermined profile, comprising:

a crucible defining an aluminothermic reaction chamber and adapted to be used in a predetermined crucible orientation in which the crucible has in its lower portion a discharge aperture opening upwardly into said chamber and downwardly into a lower external face of said crucible along a predetermined vertical axis of said crucible, said crucible lower face having a predetermined profile which complements the upper face of the mould so that said crucible can be deposited on the mould such that said discharge aperture is coaxial with the pouring bush, wherein the crucible has in the upward direction, in said crucible orientation, an upper edge bounding an upper opening of said chamber, and the crucible bears via said edge an added cover which closes said chamber and is provided with venting means and wherein the cover has along the axis of the crucible a depressed zone bounding with adjacent zones of the cover at least one annular venting aperture opening towards the outside of the crucible in the direction of the axis of the crucible.

23. A device according to claim 22, wherein the cover is of sand agglomerated with a hydrophobic resin.

24. A device according to claim 22, wherein the cover and the upper edge of the crucible have respective conforming surfaces enabling them to bear substantially continuously against one another and to seal against one another.

25. A device according to claim 24, wherein it comprises a filter cap enclosing at least the venting means of the cover, and the cover and the filter cap have respective conforming surface enabling them to bear substantially continuously against one another and to seal against one another.

26. An aluminothermic welding device for the butt welding of two metal members such as railroad rails, that has a mould adapted to be fitted locally onto the two metal members to define thereon a mould cavity in a predetermined mould orientation in which the mould has in its upper portion a pouring bush opening downwardly into the cavity and upwardly into an outer upper face of the mould along a predetermined vertical axis of the mould, wherein the upper face of the mould has a predetermined profile, comprising:

a crucible defining an aluminothermic reaction chamber and adapted to be used in a predetermined crucible orientation in which the crucible has in its lower portion a discharge aperture opening upwardly into said chamber and downwardly into a lower external face of said crucible along a predetermined vertical axis of said crucible, said crucible lower face having a predetermined profile which complements the upper face of the mould so that said crucible can be deposited on the mould such that said discharge aperture is coaxial with the pouring bush wherein said respectively lower face of the crucible and upper face of the mould have two respective flat zones which are oriented substantially perpendicular to the axis of the crucible and the axis of the mould respectively and converge together to form therebetween a dihedron of angle $(\alpha, \delta)$ approximately 180°, the dihedra formed by said flat zones of the lower face of the crucible and said flat zones of the upper face of the mould being mutually complementary so that each of said flat zones of the lower face of the crucible bears flat against a respectively corresponding flat zone of the upper face of the mould in said operative position.

27. A device according to claim 26, wherein said flat zones of the lower face of the crucible converge on the axis of the crucible, and said flat zones of the upper face of the mould converge on the axis of the mould.

28. A device according to claim 27, wherein said flat zones of the lower face of the crucible and the upper face of the mould respectively converge downwards in said operative position.

29. An aluminothermic welding device for the butt welding of two metal members such as railroad rails, that has a mould adapted to be fitted locally onto the two metal members to define thereon a mould cavity in a predetermined mould orientation in which the mould has in its upper portion of pouring bush, opening downwardly into the cavity and upwardly into an outer upper face of the mould along a predetermined vertical axis of the mould, wherein the upper face of the mould has a predetermined profile, comprising:

a crucible defining an aluminothermic reaction chamber and adapted to be used in a predetermined crucible orientation in which the crucible has in its lower portion a discharge aperture opening upwardly into said chamber and downwardly into a lower external face of said crucible along a predetermined vertical axis of said crucible, said crucible lower face having a predetermined profile high complements the upper face of the mould so that said crucible can be deposited on the mould such that said discharge aperture is coaxial with the pouring bush wherein said respective lowerface of the crucible and the upper face of the mould have shapes such as to leave between the crucible and the mould at least one venting passage connecting the pouring bush to the outside of the crucible and the mould in said operative position.

30. A device according to claim 29, wherein said venting passage has a section which increases in a direction from the pouring bush towards the outside of the crucible and the mould.

31. A device according to claim 26, wherein at least one of said flat zones of the lower face of the crucible comprises said venting passage with the respectively corresponding flat zone of the upper face of the mould in said operative position.

32. An aluminothermic welding deice for the butt welding of two metal members such as railroad rails, that has a mould adapted to be fitted locally onto the two metal members to define thereon a mould cavity in a predetermined mould orientation in which the mould has in its upper portion a pouring bush, opening downwardly into the cavity and upwardly into an outlet upper face of the mould along a predetermined vertical axis of the mould, wherein the upper face of the mould has a predetermined profile, comprising:

a crucible defining an aluminothermic reaction chamber and adapted to be used in a predetermine crucible orientation in which the crucible has in its lower portion a discharge aperture opening upwardly into said chamber and downwardly into a lower external face of said crucible along a predetermined vertical axis of said crucible, said crucible lower face having a predetermined profile which complements the upper face of the mould so that said crucible can be deposited on the mould such that said discharge aperture is coaxial with the pouring bush wherein said respectively lower face of the crucible and upper face of the mould have shapes such that they leave between the crucible and the mould at least one corundum passage connecting the pouring bush to the outside of the crucible and the mould in said operative position.

33. A device according to claim 32, wherein at least one of said flat zones of the upper face of the mould if formed with a notch bounding said corundum passage with the respectively corresponding flat zone of the lower face of the crucible in said operative position.

34. An aluminothermic welding device for the butt welding of two metal members such as railroad rails, that has a mould adapted to be fitted locally onto the two metal members to define thereon a mould cavity in a predetermined mould orientation in which the mould has in its upper portion a pouring bush, opening downwardly into the cavity and upwardly into an outer upper face of the mould along a predetermined vertical axis of the mould, wherein the upper face of the mould has a predetermined profile, comprising:

a crucible defining an aluminothermic reaction chamber and adapted to be used in a predetermined crucible orientation in which the crucible has in its lower portion a discharge aperture opening upwardly into said chamber and downwardly into a lower external face of said crucible along a predetermined vertical axis of said crucible, said crucible lower face having a predetermined profile which complements the upper face of the mould so that said crucible can be deposited on the mould such that said discharge aperture is coaxial with the pouring bush wherein the lower face of the crucible has around the discharge aperture an annular rim projecting along said axis of the crucible and adapted to fit with clearance into the pouring bush and has respectively on either side of the discharge aperture projecting abutments so disposed as to extend along the mould respectively on either side of said upper face thereof.

35. A device according to claim 24, wherein said abutments have respective free ends coplanar in a plane perpendicular to the axis of the crucible.

36. A device according to claim 25, wherein said rim is in line with said plane.

37. An aluminothermic welding device for the butt welding of two metal members such as railroad rails, that has a mould adapted to be fitted locally onto the two metal members to define thereon a mould cavity in a predetermined mould orientation in which the mould has in its upper portion a pouring bush, opening downwardly into the cavity and upwardly into an outer upper face of the mould along a predetermined vertical axis of the mould, wherein the upper face of the mould has a predetermined profile, comprising:

a crucible defining an aluminothermic reaction chamber and adapted to be used in a predetermined crucible orientation in which the crucible has in its lower portion a discharge aperture opening upwardly into said chamber and downwardly into a lower external face of said crucible along a predetermined vertical axis of said crucible, said crucible lower face having a predetermined profile which complements the upper face of the mould so that said crucible can be deposited on the mould such that said discharge aperture is coaxial with the pouring bush, wherein the crucible comprises inside the discharge aperture means for accommodating a thermally meltable closure member, and wherein the crucible comprises a thermally meltable closure member inside the discharge aperture and wherein the crucible is made of sand agglomerated by means of a hydrophobic resin and wherein the crucible has in the upward direction, in said crucible orientation, an upper edge bounding an upper opening of said chamber, and the crucible bears externally an annular hoop around said upper edge and wherein said annular hoop is a ribbon fitting tightly around said edge and rigidly connected thereto and wherein the crucible has a localized portion of reduced thickness straight above the pouring bush in said operative position and wherein the crucible has adjacent the discharge aperture a blind bore in said operative position.

38. An aluminothermic device for the butt welding of two metal members such as railroad rails, that has a crucible which defines an aluminothermic reaction chamber and is adapted to be used in a predetermined crucible orientation in which the crucible has in its lower portion a discharge aperture opening upwardly into said chamber and downwardly into a lower external face, the crucible having a predetermine vertical axis, and further having in the upward direction an upper edge bounding an upper opening of said chamber, comprising:

a cover operatively connected to the upper edge of the crucible such that said cover encloses the chamber, said cover having along the axis of the crucible a depressed zone bounding with adjacent zones of the cover at least one annular venting aperture opening towards the outside of the crucible in the direction of the axis of the crucible, the cover and the upper edge of the crucible having respective conforming surfaces enabling them to bear substantially continuously against one another and to seal against one another; and a filter cap enclosing at least the venting means of the cover, wherein the cover and the filter cap have respective conforming surfaces enabling them to bear substantially continuously against one another and to seal against one another.

* * * * *

UNITED STATES PATENT AND TRADEMARK OFFICE
CERTIFICATE OF CORRECTION

PATENT NO. : 5,151,202
DATED : September 29, 1992
INVENTOR(S) : Bommart It is certified that error appears in the above-identified patent and that said Letters Patent is hereby corrected as shown below:

| | | |
|---|---|---|
| col. 11, line 57 | delete "3" | insert --4-- |
| col. 12, line 01 | delete "3" | insert --13--- |
| col. 15, line 66 | delete "t" | insert --to-- |
| col. 19, line 03 | delete "moulding" | insert --mould in-- |
| col. 19, line 43 | delete "as" | insert --has-- |
| col. 20, line 25 | delete "surface" | insert --surfaces-- |
| col. 21, line 08 | delete "of" | insert --a-- |
| col. 21, line 20 | delete "high" | insert --which-- |
| col. 21, line 24 | delete "lowerface" | insert --lower face-- |
| col. 21, line 39 | delete "deice" | insert --device-- |
| col. 21, line 45 | delete "outlet" | insert --outer-- |
| col. 21, line 50 | delete "predetermine" | insert --predetermined-- |
| col. 21, line 67 | delete "if" | insert --is-- |
| col. 22, line 31 | after "thereof" | insert --in said operative position-- |
| col. 22, line 32 | delete "24" | insert --34-- |
| col. 22, line 35 | delete "25" | insert --35-- |
| col. 23, line 15 | delete "predetermine" | insert --predetermined-- |

Signed and Sealed this

Seventh Day of December, 1993

BRUCE LEHMAN

Attest:

*Attesting Officer*

*Commissioner of Patents and Trademarks*